(12) United States Patent
Martin

(10) Patent No.: US 11,525,296 B1
(45) Date of Patent: Dec. 13, 2022

(54) LIVE WELL

(71) Applicant: Wade B. Martin, Booneville, MS (US)

(72) Inventor: Wade B. Martin, Booneville, MS (US)

( * ) Notice: Subject to any disclaimer, the term of this patent is extended or adjusted under 35 U.S.C. 154(b) by 36 days.

(21) Appl. No.: 17/186,159

(22) Filed: Feb. 26, 2021

(51) Int. Cl.
*E05F 15/00* (2015.01)
*E05F 15/63* (2015.01)
*A01K 63/02* (2006.01)
*B63B 35/26* (2006.01)

(52) U.S. Cl.
CPC ............ *E05F 15/63* (2015.01); *A01K 63/02* (2013.01); *B63B 35/26* (2013.01); *E05F 2015/631* (2015.01); *E05Y 2201/434* (2013.01); *E05Y 2201/624* (2013.01); *E05Y 2201/684* (2013.01); *E05Y 2400/85* (2013.01); *E05Y 2900/514* (2013.01)

(58) Field of Classification Search
CPC ........ A01K 63/02; A01K 97/18; A01K 97/20; A01K 97/05; B65D 43/12; B65H 45/164; B65H 45/166; Y10K 224/92; B63J 2/08; B63J 2/04; B63B 35/14; B63B 35/26; E05F 15/63; E05F 2015/631; E05Y 2201/434; E05Y 2201/624; E05Y 2201/684; E05Y 2400/85; E05Y 2900/514
USPC .......................... 49/340; 114/255, 211; 43/56
See application file for complete search history.

(56) References Cited

U.S. PATENT DOCUMENTS

| | | | |
|---|---|---|---|
| 4,033,280 A | 7/1977 | Wood et al. | |
| 4,748,765 A | 6/1988 | Martin | |
| 4,811,680 A * | 3/1989 | Genth | B63B 19/14 114/211 |
| 4,845,886 A * | 7/1989 | Robinson | A01K 97/20 224/920 |
| 5,171,173 A * | 12/1992 | Henderson | B63H 20/007 440/7 |
| 5,191,732 A | 3/1993 | Berdinsky et al. | |
| 5,275,249 A * | 1/1994 | Nelson | B62D 25/12 180/69.2 |
| 5,722,197 A | 3/1998 | Albritton | |
| 6,105,305 A | 8/2000 | Edens | |
| 6,192,820 B1 * | 2/2001 | Anderson | B63B 35/26 43/55 |
| 6,354,238 B1 * | 3/2002 | Molesworth | B63B 25/00 114/343 |
| 6,468,117 B1 * | 10/2002 | Healey | B63H 21/213 440/7 |
| 6,572,182 B2 * | 6/2003 | Lamparter | E05F 15/63 296/216.02 |
| 6,810,617 B1 | 11/2004 | Burroughs et al. | |
| 6,877,269 B2 * | 4/2005 | Schultz | A01K 97/04 43/55 |
| 7,434,529 B2 | 10/2008 | Tipton | |

(Continued)

*Primary Examiner* — Chi Q Nguyen
(74) *Attorney, Agent, or Firm* — Cramer Patent & Design, PLLC; Aaron R. Cramer

(57) ABSTRACT

The live well lid system may comprise a lid, a hinge, a motor, a lift arm, a lid track, and a local foot control. The live well lid system may be a system for covering and uncovering a live well of a boat by pivoting the lid of the live well responsive to input from the local foot control. The live well lid system may be adapted for a user to pivot the lid by operating the local foot control located proximate to the live well without diverting the attention of the user or requiring use of the user's hands. In some embodiments, a remote foot control may be a secondary control located at a remote location on the boat.

15 Claims, 4 Drawing Sheets

(56) References Cited

U.S. PATENT DOCUMENTS

| | | | |
|---|---|---|---|
| 7,464,498 B2 | 12/2008 | Lester | |
| 8,677,689 B1 * | 3/2014 | Draper | E05F 15/63 49/281 |
| 10,542,737 B2 * | 1/2020 | Beach | A01K 97/04 |
| 11,140,886 B1 * | 10/2021 | Shore | A01K 97/20 |
| 2018/0163453 A1 * | 6/2018 | Attee | E05F 11/08 |

* cited by examiner

LIVE WELL

RELATED APPLICATIONS

Not applicable.

FIELD OF THE INVENTION

The presently disclosed subject matter is directed to a live well for a fishing boat.

BACKGROUND OF THE INVENTION

Many fishing boats have live wells that are built into the boat by the manufacturer. These live wells allow caught fish to be placed inside where they can remain alive for the rest of the expedition to ensure they remain fresh. Once a fish is caught, the user must bend over to lift the lid and place the fish inside. It is somewhat cumbersome process especially if the boat is moving about.

Should another fisherman on the boat be able to lift the lid, the process is much easier and simpler. Accordingly, there exists a need for a means by which the lids on live wells on fishing boats can be automatically raised and lowered to address the shortcomings of manually operated lids. The development of the live well buddy provides this solution.

SUMMARY OF THE INVENTION

The principles of the present invention provide for a live well lid system that has a lid covering a live well of a boat, a hinge which is hingedly coupled to the lid to the boat, a motor which converts electrical energy into mechanical energy, a lift arm which pivots in a direction that pushes the lid open when the electrical energy has a first polarity and pulls the lid closed when the electrical energy has a second polarity, a lid track which is coupled to the lid and a local foot control energizing or deenergizing the motor to determine the polarity of the electrical energy applied to the motor. The lid is pivoted to an open position to provide access to the live well and the lid pivots to a closed position to cover the live well. The motor causes pivoting of the lift arm when electrical energy is applied to the motor.

The boat may include a plurality of live wells and an equivalent number of the live well lid system. The lid may be pivoted to the open position to place fish into the live well or to remove bait from the live well. The lid may pivot to the closed position to assist in controlling the environment within the live well and to prevent someone from accidentally stepping into the live well. The electrical energy may be applied to the motor is controlled by the local foot control. The electrical energy may be provided by an electrical system of the boat. The motor may include one or more motion limiters which may block the electrical energy that turn the motor past a maximum up position or past a maximum down position.

A distance between the hinge and the motor may be fixed and a length of the lift arm is fixed. The motor may pivot the lift arm and the distance between the hinge and the distal end of the lift arm must change, resulting in the distal end of the lift arm sliding in the lid track changing the angle of the lid. The lift arm may be an armature that may be coupled to the motor at a proximal end and slidably coupled to the lid track at a distal end. The motor may be energized, and the proximal end of the lift arm may pivot while the distal end of the lift arm may slide along the lid track. The lid track may be a guide for the distal end of the lift arm and may pivot as the distal end of the lift arm slides along the lid track. The local foot control may be mounted to a deck of the boat proximate to the live well where it is activated by a user's foot. The local foot control may be a momentary contact push button switch that may energize the motor with electrical energy having the first polarity when depressed and which energizes the motor with electrical energy having the second polarity when released.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
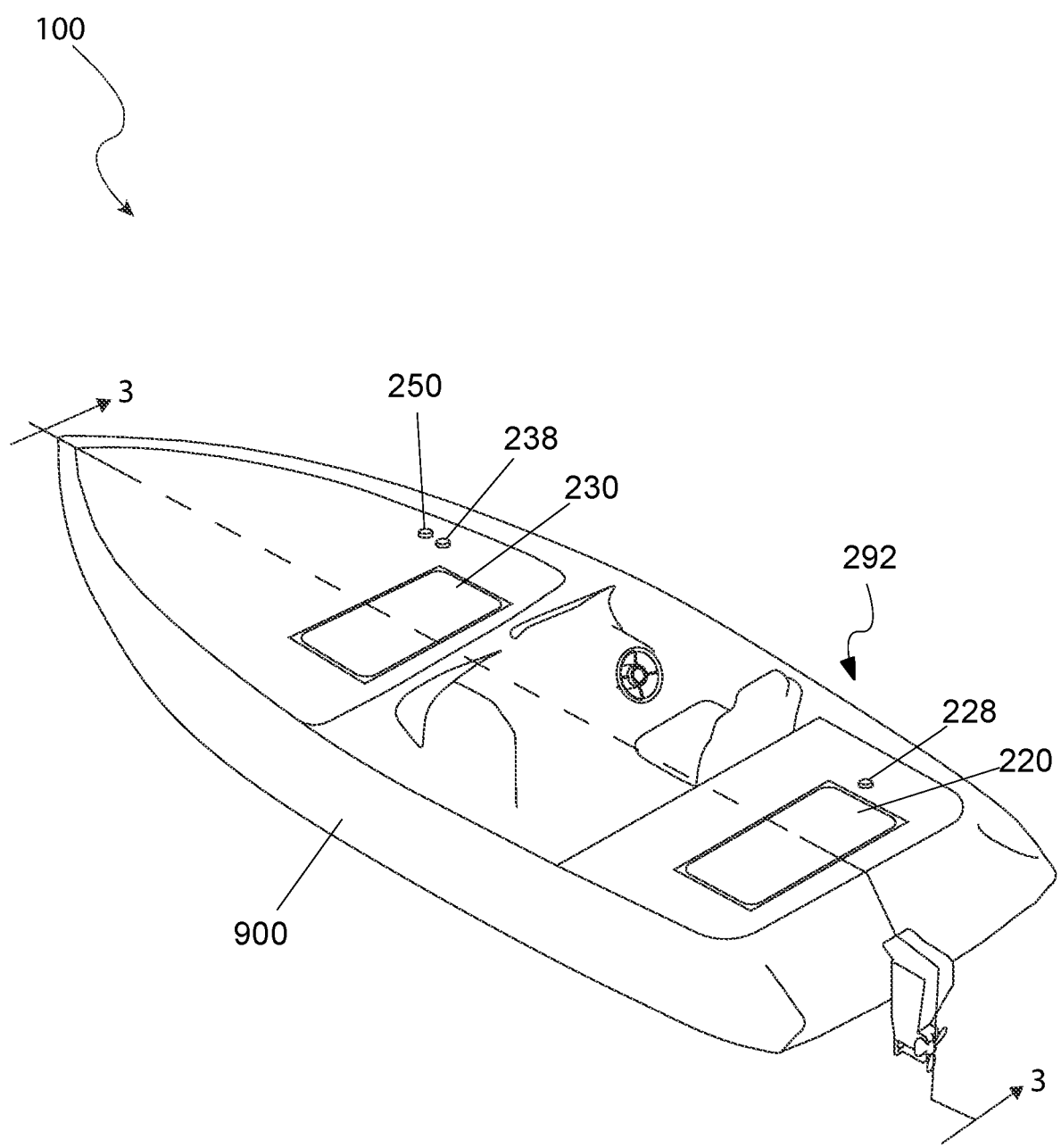
FIG. 1 is an isometric view of a live well lid system, according to an embodiment of the present invention.
Figure 2:
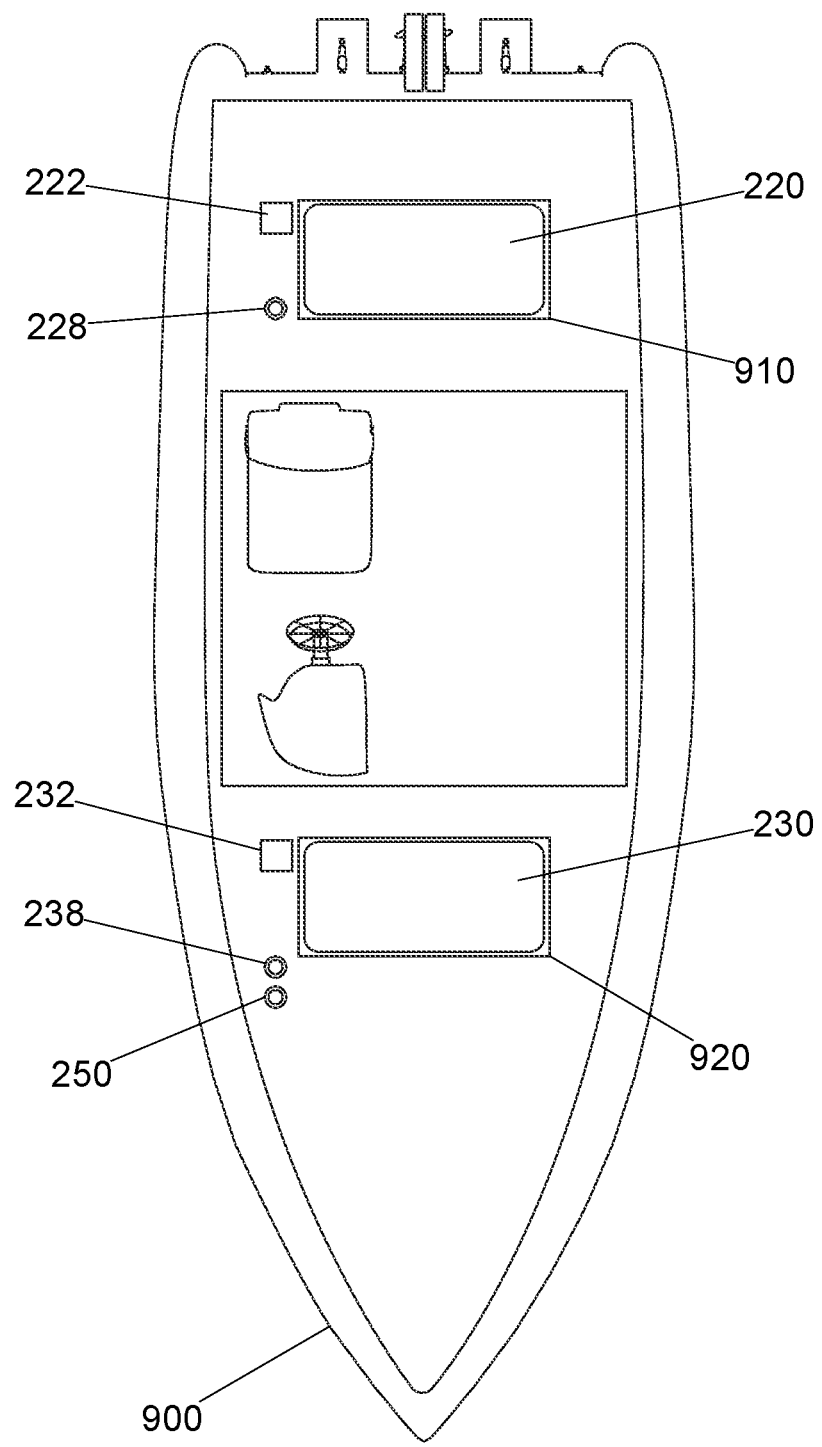
FIG. 2 is a top view of a live well lid system, according to an embodiment of the present invention.
Figure 3:
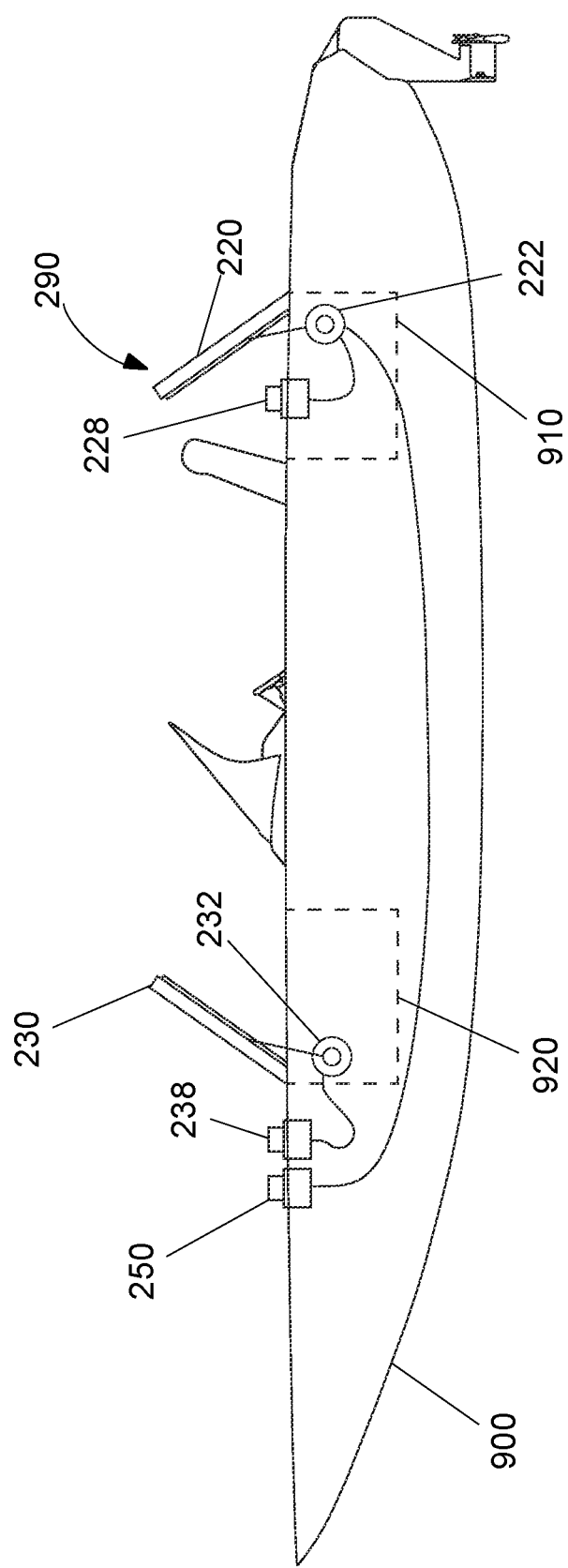
FIG. 3 is a cross-sectional view of a live well lid system across the Line 3-3 (as shown in FIG. 1), according to an embodiment of the present invention.
Figure 4:
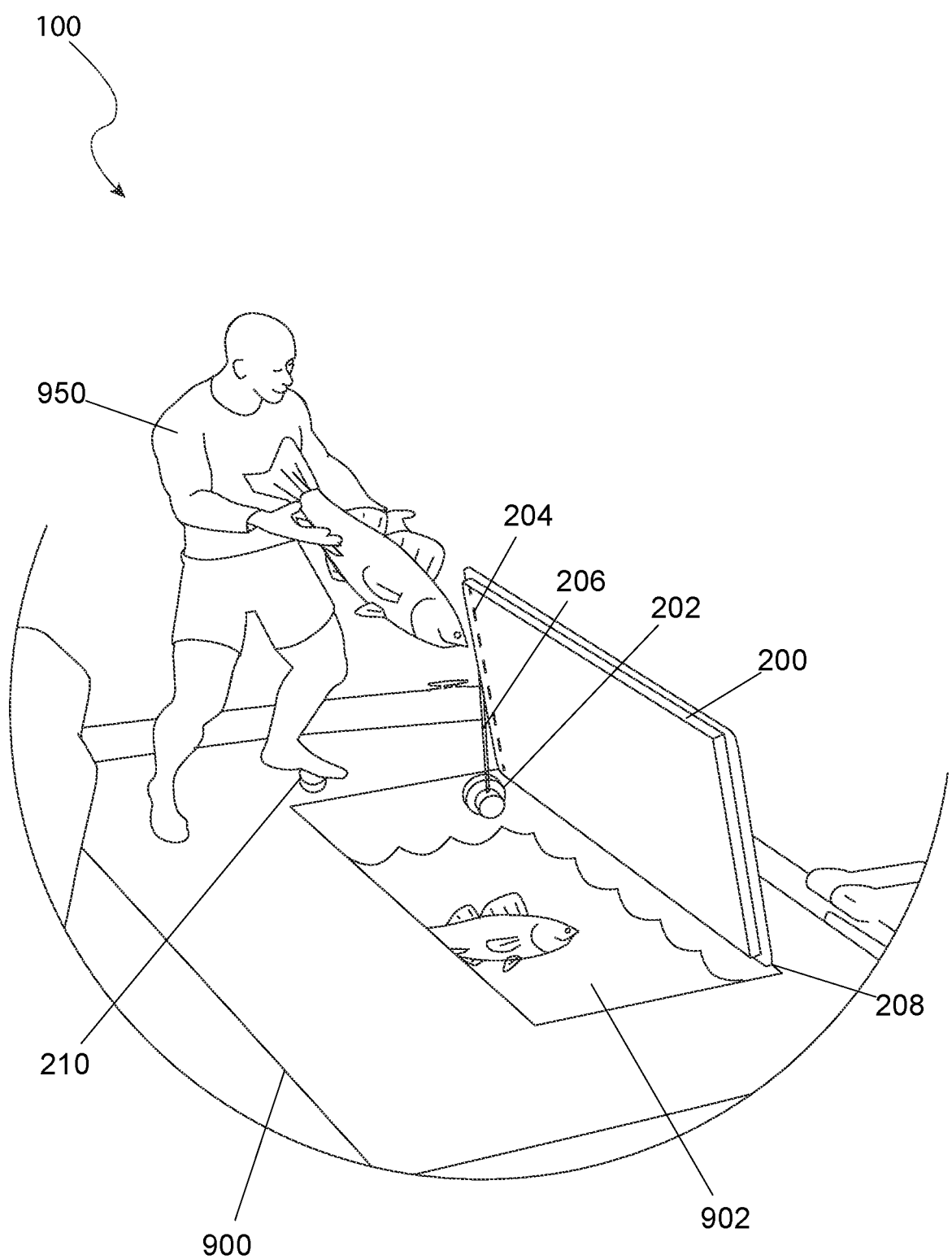
FIG. 4 is an in-use view of a live well lid system, according to an embodiment of the present invention.

DESCRIPTIVE KEY 100 live well lid system
200 lid
202 motor
204 lid track
206 lift arm
208 hinge
210 local foot control
220 first lid
222 first motor
228 first local foot control
230 second lid
232 second motor
238 second local foot control
250 remote foot control
290 open position
292 closed position
900 boat
902 live well
910 first live well
920 second live well
950 user

DESCRIPTION OF THE INVENTION

The present invention is directed to a live well lid system (herein described as the "invention") 100. The invention 100 may comprise a lid 200, a hinge 208, a motor 202, a lift arm 206, a lid track 204, and a local foot control 210. The invention 100 may be a system for covering and uncovering a live well 902 of a boat 900 by pivoting the lid 200 of the live well 902 responsive to input from the local foot control 210. The invention 100 may be adapted for a user 950 to pivot the lid 200 by operating the local foot control 210 located proximate to the live well 902 without diverting the attention of the user 950 or requiring use of the user's hands. In some embodiments, a remote foot control 250 may be a secondary control located on the opposite half of the boat 900.

The lid 200 may be a hatch for covering the live well 902. The lid 200 may be hingedly coupled to the boat 900 via the hinge 208. The lid 200 may be pivoted to an open position 290 to provide access to the live well 902. As non-limiting examples, the lid 200 may be pivoted to the open position 290 to place fish into the live well 902 or to remove bait from the live well 902. The lid 200 may pivot to a closed position 292 to cover the live well 902. As a non-limiting example, the lid 200 may be pivoted to the closed position 292 to assist in controlling the environment within the live well 902 and to prevent someone from accidently stepping into the live well 902.

The motor 202 may convert electrical energy into mechanical energy. The motor 202 may cause pivoting of the lift arm 206 when electrical energy is applied to the motor 202. The electrical energy applied to the motor 202 may be controlled by the local foot control 210. The lift arm 206 may pivot in a direction that pushes the lid 200 open when the electrical energy has a first polarity. The lift arm 206 may pivot in a direction that pulls the lid 200 closed when the electrical energy has a second polarity. The electrical energy may be provided by an electrical system of the boat 900. In some embodiments, the motor 202 may comprise one (1) or more motion limiters which may block the electrical energy that would turn the motor 202 past a maximum up position or past a maximum down position.

The lift arm 206 may be an armature that is coupled to the motor 202 at a proximal end and slidably coupled to the lid track 204 at a distal end. When the motor 202 is energized, the proximal end of the lift arm 206 may pivot and the distal end of the lift arm 206 may slide along the lid track 204.

The lid track 204 may be couple to the lid 200. The lid track 204 may be a guide for the distal end of the lift arm 206. The lid 200 may pivot as the distal end of the lift arm 206 slide along the lid track 204. The distance between the hinge 208 and the motor 202 is fixed and the length of the lift arm 206 is fixed. Therefore, as the motor 202 pivots the lift arm 206, the distance between the hinge 208 and the distal end of the lift arm 206 must change, meaning that the distal end of the lift arm 206 must slide in the lid track 204. In addition, the angle of the lid 200 must change. The lid 200 may pivot open or closed, dependent upon the direction of the motor.

The local foot control 210 may energize or deenergize the motor 202 and may determine the polarity of the electrical energy applied to the motor 202. The local foot control 210 may be mounted to the deck of the boat 900 proximate to the live well 902 where it may be activated by a foot.

In some embodiments, the local foot control 210 may be a momentary contact push button switch that energizes the motor 202 with electrical energy having the first polarity when depressed and which energizes the motor 202 with electrical energy having the second polarity when released. In these embodiments, the lid 200 may open when the local foot control 210 is pressed and the lid 200 may close when the local foot control 210 is released.

In some embodiments, the local foot control 210 may be a momentary contact push button switch with a polarity reversing feature that energizes the motor 202 with electrical energy having the first polarity when depressed and which deenergizes the motor 202 when released. Subsequent depressions of the switch may reverse the polarity of the electrical energy such that the polarity alternates between the first polarity and the second polarity with each subsequent depression of the switch. In these embodiments, a press and release of the local foot control 210 may open the lid 200 and a subsequent press and release of the local foot control 210 may close the lid 200.

In some embodiments, the boat 900 may comprise two or more of the live wells 902 and an equivalent number of the inventions 100. As a non-limiting example, the boat 900 may comprise a first live well 910 astern and a second live well 920 forward. The first live well 910 may be covered by a first lid 220 which is pivoted by a first motor 222 when energized by a first local foot control 228. The second live well 920 may be covered by a second lid 230 which is pivoted by a second motor 232 when energized by a second local foot control 238. The first local foot control 228 may be located adjacent to the first live well 910 and the second local foot control 238 may be located adjacent to the second live well 920.

In some embodiments, the remote foot control 250 may be a secondary control located at a location on the boat 900 that is away from the well that the remote foot control 250 operates. As a non-limiting example, the first live well 910 which is astern may be electrically coupled to both the first local foot control 228 and the remote foot control 250. The first local foot control 228 may be adjacent the first live well 910. The remote foot control 250 may be located forward and adjacent to the second local foot control 238 such that the first lid 220 and the second lid 230 may both be activating from the second live well 920 by operating the first local foot control 228 and the remote foot control 250.

In use, a live well 902 on a boat 900 may be covered by a lid 200 to preserve the environment inside of the live well 902 and to prevent injuries. The lid 200 may be opened by activating a local foot control 210 with a foot. The lid 200 may be closed by deactivating the local foot control 210 or, in some embodiments, by activating the local foot control 210 a second time.

In some embodiments, the boat 900 may comprise a first live well 910 astern and a second live well 920 forward. The first live well 910 may be covered by a first lid 220 which may be opened and closed by a first local foot control 228 located adjacent to the first live well 910. The second live well 920 may be covered by a second lid 230 which may be opened and closed by a second local foot control 238 located adjacent to the second live well 920. A remote foot control 250 may be located forward, adjacent the second local foot control 238, and may open and close the first lid 220.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A live well lid system, comprising:
   a boat,
   a hinge hingedly coupling a lid to the boat, the lid is pivoted to an open position to provide access to a live well and the lid pivots to a closed position to cover the live well,
   a lift arm pivoting in a direction that pushes the lid open at a first polarity and pulls the lid closed at a second polarity, a motor converting a plurality of electrical energy into a plurality of mechanical energy, the motor causes pivoting of the lift arm and the electrical energy is applied to the motor, a lid track couple to the lid, and a local foot control energizing or deenergizing the motor to determine a polarity of the electrical energy applied to the motor, wherein the motor pivots the lift arm and the distance between the hinge and the distal end of the lift arm must change, resulting in the distal end of the lift arm sliding in the lid track changing the angle of the lid.

2. The live well lid system, according to claim 1, wherein the boat includes a plurality of the live wells and an equivalent number of the live well lid system.

3. The live well lid system, according to claim 1, wherein the lid is pivoted to the open position to place fish into the live well or to remove bait from the live well.

4. The live well lid system, according to claim 1, wherein the lid pivots to the closed position to assist in controlling the environment within the live well and to prevent someone from accidently stepping into the live well.

5. The live well lid system, according to claim 1, wherein the electrical energy applied to the motor is controlled by the local foot control.

6. The live well lid system, according to claim 1, wherein the electrical energy is provided by an electrical system of the boat.

7. The live well lid system, according to claim 1, wherein the motor includes one or more motion limiters that block the electrical energy that turn the motor past a maximum up position or past a maximum down position.

8. The live well lid system, according to claim 1, wherein a distance between the hinge and the motor is fixed and a length of the lift arm is fixed.

9. The live well lid system, according to claim 1, wherein the lift arm is an armature that is coupled to the motor at a proximal end and slidably coupled to the lid track at a distal end.

10. The live well lid system, according to claim 1, wherein the motor is energized and the proximal end of the lift arm pivots and the distal end of the lift arm slides along the lid track.

11. The live well lid system, according to claim 1, wherein the lid track is a guide for the distal end of the lift arm and pivots as the distal end of the lift arm slides along the lid track.

12. The live well lid system, according to claim 1, wherein the local foot control is mounted to a deck of the boat proximate to the live well where the local foot control is activated by a user's foot.

13. The live well lid system, according to claim 1, wherein the live well lid system is a system for covering and uncovering the live well of the boat by pivoting the lid of the live well responsive to input from the local foot control.

14. The live well lid system, according to claim 1, wherein the live well lid system is adapted for a user to pivot the lid by operating the local foot control located proximate to the live well without diverting the attention of the user or requiring use of a user's hands.

15. The live well lid system, according to claim 1, further comprising a remote foot control that is a secondary control located on an opposite half of the boat.

* * * * *